United States Patent [19]
Picozzi

[11] 3,844,162
[45] Oct. 29, 1974

[54] INSPECTION APPARATUS
[75] Inventor: Charles D. Picozzi, Philadelphia, Pa.
[73] Assignee: The United States of America as represented by the Secretary of the Army, Washington, D.C.
[22] Filed: Aug. 1, 1972
[21] Appl. No.: 276,996

[52] U.S. Cl............... 73/37.5, 33/169 R, 209/74 R
[51] Int. Cl. ......................................... G01b 13/14
[58] Field of Search.................... 73/37.5, 37.9, 37; 33/169 B, 169 R, DIG. 2; 209/74 R, 109

[56] References Cited
UNITED STATES PATENTS
3,116,478   12/1963   Powell........................... 33/169 R X
3,387,704   6/1968   Powers, Jr..................... 209/74 R X
3,464,547   9/1969   Becker.......................... 209/74 R X Primary Examiner—Richard C. Queisser
Assistant Examiner—Joseph W. Roskos
Attorney, Agent, or Firm—Edward J. Kelly; Herbert Berl; William Sommer

[57] ABSTRACT

An inspection arrangement for determining the condition of primer units secured in cartridge cases during the assembly thereof. At the gaging station of the arrangement a detect stem is mechanically inserted into the mouth of the cartridge case that is suspended in an inverted position. The extent of detect stem travel is translated to a fluidic transducer head that controls fluid operated means for indicating acceptance or rejection of the primer unit mounting in each inspected case.

5 Claims, 3 Drawing Figures

INSPECTION APPARATUS

The invention described herein may be manufactured, used, and licensed by or for the Government for governmental purposes without the payment to me of any royalty thereon.

This invention relates to inspection apparatus, and more particularly to an arrangement for inspecting the condition of primer units secured in cartridge cases.

It is an object of the invention to provide an inspection arrangement for automatically determining the condition of primer units secured in cartridge cases during assembly.

Another object of the invention is to provide such an arrangement which is accurate and does not require periodic adjustments.

These and other objects, features and advantages will become more apparent from the following description and accompanying drawings in which.

Figure 1:
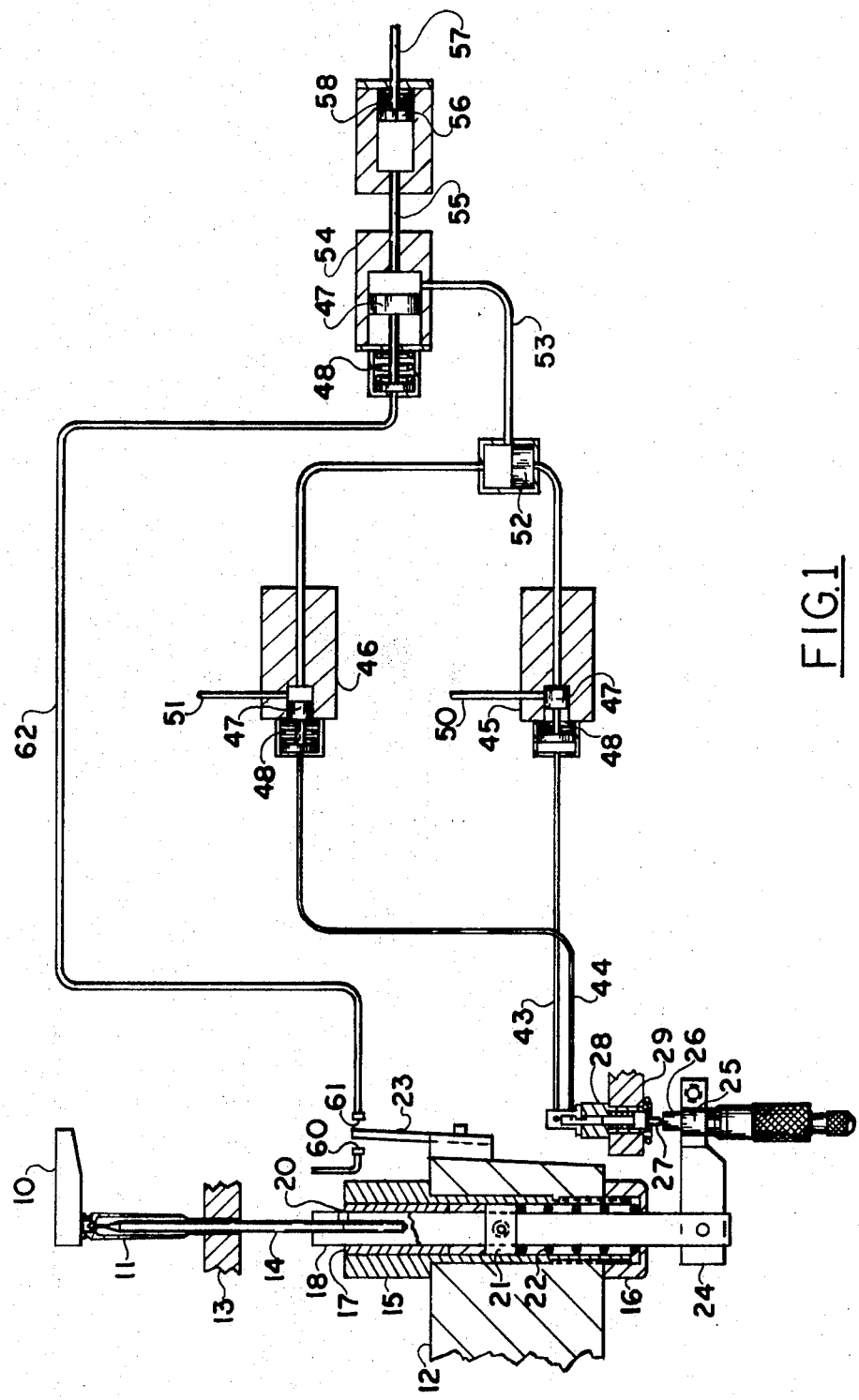
FIG. 1 is an elevational sectional view, partially broken away, and associated flow diagram of a preferred inspection arrangement embodying the principles of the invention.

The inspection or gaging arrangement includes a fixed stop plate 10 (FIG. 1) and bottom rail 13 between which an inverted cartridge case 11 to be inspected may be suspended, and a vertically movable gaging unit carried by a vertically reciprocable lower gate or ram 12. The fixed bottom rail 13 on the machine is vertically apertured to permit upward passage of the upstanding gage or detect stem 14 into the aligned mouth of the cartridge case 11.

A vertical tubular guide member 15 extends through the vertical opening of the ram 12 and is secured in position by hex nut 16 which is threadedly connected to its lower end. Tubular guide 15 preferably has a sleeve 17 suitably secured in its upper portion for slidably receiving the vertically oriented shaft 18. The upper end of shaft 18 is recessed for reception of the lower portion of detect stem 14 to the extent desired prior to securement by set screw 20. The mid-portion of shaft 18 has a bushing 21 suitably secured thereto for slidable motion within the guide 15 as permitted by compression spring 22 that surrounds the lower portion of shaft 18 within the tubular guide 15. Appropriately secured to the ram 12 is an upstanding plate 23 for a purpose to be later described.

Figure 2:
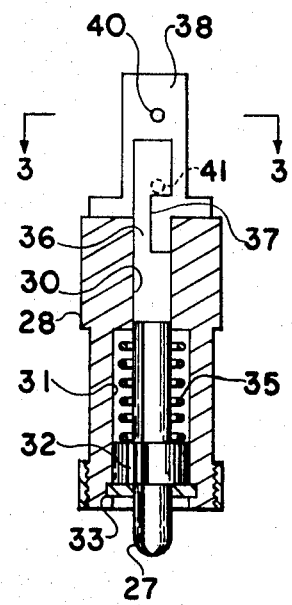
FIG. 2 is a sectional view of the transducer head employed in the FIG. 1 arrangement.
Figure 3:
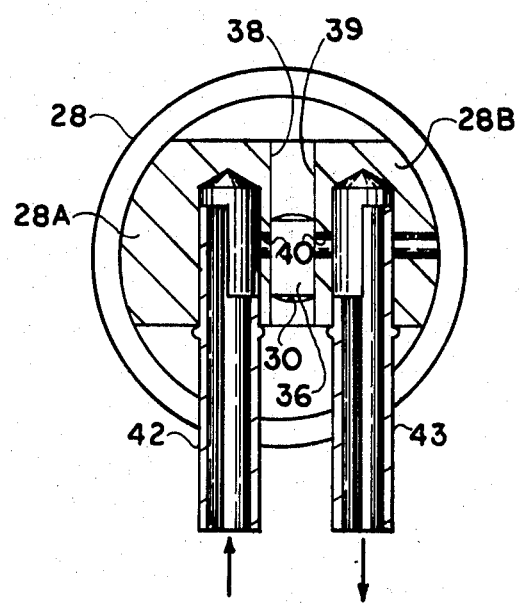
FIG. 3 is an enlarged sectional view taken along line 3—3 of FIG. 2 and turned 90° counterclockwise.

An adaptor 24 is secured to the lower end of shaft 18 and has a split collar portion to suitably secure thereto an adjustable micrometer head 25. Micrometer head 25 has a vertically adjustable upper end 26 that supports the lower tip of probe 27 that normally projects downwardly from a transducer head body 28 (FIGS. 1, 2, 3) which is appropriately secured in a fixed member 29 of the machine.

The lower portion of the transducer probe 27 is cylindrical in cross section and has substantially the same diameter as the vertically oriented guide passage 30 in the central portion of body 28. The lower portion of body 28 has a downwardly opening, enlarged probe chamber 31 which slidably receives the enlarged cylindrical protuberance or bushing 32 that is suitably provided on the probe lower stem portion and supported by C-shaped retaining ring 33. Compression spring 35 surrounds the probe stem above the enlargement 32 for biasing the probe 27 downwardly against the vertically aligned micrometer head 26. The upper portion of body 28 is transversely slotted to define opposed upstanding bifurcated portions 28A, 28B, the facing wall portions 38, 39 each containing a pair of vertically spaced ports 40, 41 that are matingly aligned in a transverse direction to provide a pair of cross jets. Respective ports 40 and 41 of upstanding bifurcate 28A are in fluid communication with a corresponding one of lateral conduits 42, 42 that deliver low pressure air from a common source (not shown). Corresponding ports 40 and 41 of upstanding bifurcate 28B are in fluid communication with respective exit tubing 43, 44 that connect with corresponding operating mechanisms of normally open valves 45, 46 for purposes to be described. The upper blade-like portion 36 of probe 27 has had certain cylindrical surfaces removed to define the substantially rectangular cross sectioned blade portion 36 that is provided with a lateral recess 37 to thus define a substantially C-shaped effective area of the blade. As the blade 36 is moved vertically by the micrometer head to predetermined positions, it sequentially alters the fluid communication across the cross jets and thereby controls the condition of valves 45, 46. This is in response to or reflects the upward travel limit or penetration by the free end or tip of detect stem or gage 14 when it has contacted the cartridge base in a stop condition.

High pressure air (approximately 50 psi.) is delivered via conduits 50, 51 preferably from a common source to valve bodies 45, 46 which, when either of their corresponding plungers 47 are alternately normally biased by their respective spring 48 to an open position, will pass high pressure air past freely movable piston 52, through conduit 53, normally open valve 54, and conduit 55 to move piston 56 and its operating rod 57 that actuates a reject mechanism (not shown).

As the machine commences operation, low pressure air is delivered from a suitable source across ports 60, 61 and through conduit 62 to close the spring biased plunger 47 of valve body 54, until ram 12 has reached a gaging position when upstanding plate 23 interrupts fluid flow into port 61, thereby enabling valve 54 to re-open and render the reject mechanism operable should either one of the valves 45 or 46 be in an open condition.

The gaging mechanism is such that after the detect stem 14 has reached a stopped or gaging position, it along with micrometer head 26 and transducer probe 27 will remain in the gaging position as the ram 12 continues a dwell movement upward (compressing spring 22) a predetermined distance prior to upstanding plate 23 reaching its air blocking position between ports 60 and 61 that causes valve 54 to re-open.

The arrangement can thus read certain conditions of the primer unit installed in the cartridge case being inspected. Should the detect stem 14 and transducer probe 27 have been raised to an acceptable elevation, the C-shaped probe blade portion 36 will have been raised to an intermediate position with lower ports 41, 41 no longer interrupted by the blade and the fluid pressure in conduit 44 will have closed valve 46, and with upper ports 40, 40 remaining uninterrupted fluid pressure in conduit or line 43 maintains valve 45 in a closed condition, whereupon no high pressure fluid is conveyed to valve 54 for compression of reject mechanism biasing spring 58.

Should the detect stem 14 and probe 27 not have been raised to an acceptable elevation due to an inverted anvil, inverted primer or missing vent hole, blade 36 will remain in a low position wherein it interrupts fluid communication between lower ports 41, 41 and enables open valve 46 to pass high pressure fluid from line 51 to line 55 and cause the piston 56 to compress spring 58 and actuate the rejection mechanism.

Should the detect stem 14 and probe 27 have been raised beyond an acceptable elevation due to a missing anvil or missing primer, blade 36 will have been raised to a high position wherein it interrupts fluid communication between upper ports 40, 40 and enables the then opened valve 45 to pass high pressure fluid from line 50 to line 55 for piston 56 to actuate the rejection mechanism.

Various modifications, changes or alterations may be resorted to without departing from the scope of the invention as defined in the appended claims.

I claim:

1. A cartridge case inspection arrangement comprising,
   - a machine having a fixed stop plate and bottom rail between which an inverted cartridge case may be suspended and a ram member mounted for vertical movement relative to said stop plate,
   - vertically apertured guide means carried by said ram and slidably receiving a vertically oriented shaft,
   - a spring within said guide means and biasing said shaft upwardly,
   - a detect stem secured to an upper portion of said shaft and adapted to enter the mouth of said inverted cartridge case,
   - an adaptor secured to a lower portion of said shaft and carrying an adjustable micrometer head, said micrometer head having a vertically adjustable upper end,
   - a transducer head having a body containing a pair of air cross jets and a downwardly biased probe slidably mounted in said body adjacent to and vertically aligned with said micrometer head, said probe having an upper blade portion adapted to sequentially alter fluid communication across said cross jets, and
   - fluid operated means controlled by said blade for indicating predetermined vertical positions of said detect stem.

2. The structure in accordance with claim 1 wherein said body has a central portion having a vertically oriented guide passage, a lower portion having a downwardly opening probe chamber, and an upper slotted portion containing said pair of air cross jets, said probe having an elongated stem slidably mounted in said guide passage and an enlargement on a lower portion of said stem slidably mounted in said probe chamber, a retaining ring in the lower portion of said body and supporting said enlargement, and a compression spring surrounding said stem above said enlargement for biasing said probe against said micrometer head.

3. The structure according to claim 2 where the upper blade portion of said probe has a lateral recess to define a substantially C-shaped effective area of said blade that may be vertically moved by said micrometer head to predetermined positions that sequentially alter fluid communication across said cross jets.

4. A transducer head for controlling cartridge rejection apparatus, comprising
   - a main body portion having a pair of air cross jets at an upper end thereof,
   - a downwardly biased probe slidably mounted in said body and adapted to be contacted by a vertically underlying micrometer head of a cartridge detect stem arrangement,
   - said body including a central portion having a vertically oriented guide passage, a lower portion having a downwardly opening probe chamber, and an upper slotted portion containing said pair of air cross jets, said body having means for applying pressurized air across said pair of air cross jets,
   - said probe having an elongated stem slidably mounted in said guide passage, an enlargement on a lower portion of said stem slidably mounted in said probe chamber, and an upper blade portion slidably mounted in said body slotted portion,
   - a retaining ring in the lower portion of said body and supporting said enlargement, and
   - a compression spring surrounding said stem above said enlargement for biasing said probe against said micrometer head.

5. The structure according to claim 4 where the upper blade portion of said probe has a lateral recess to define a substantially C-shaped effective area of said blade that may be vertically moved by said micrometer head to predetermined positions that sequentially alter fluid communication across said cross jets.

* * * * *